June 19, 1928. 1,674,243
E. C. FILSTRUP
FEED FINGER ACTUATING DEVICE FOR SAW SHARPENING MACHINES
Filed Jan. 14, 1927
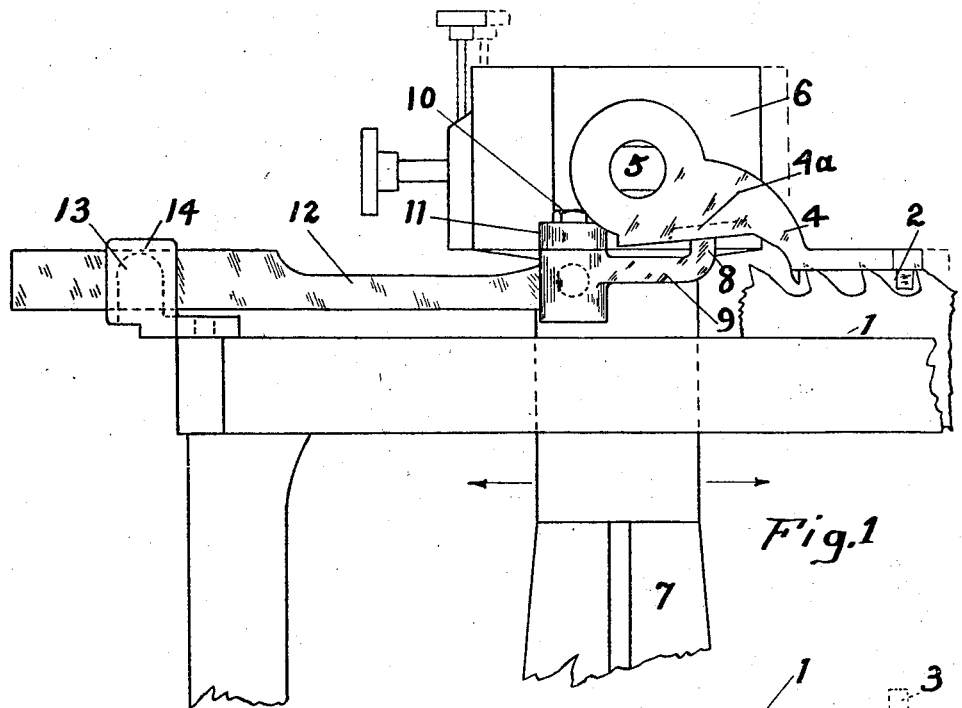
Fig.1
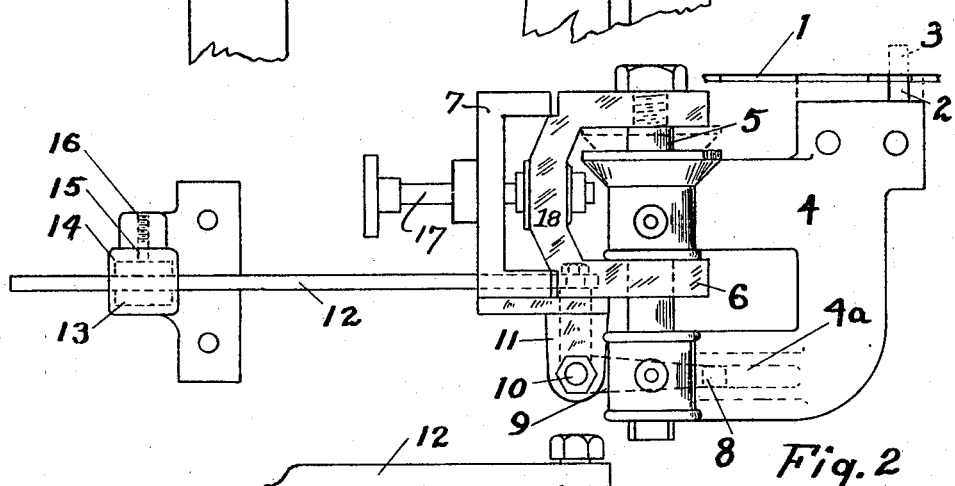
Fig.2
Fig.3
INVENTOR
Eddie C. Filstrup
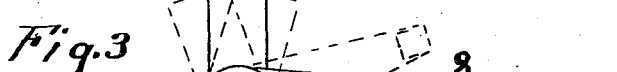
ATTORNEY Patented June 19, 1928.

1,674,243

UNITED STATES PATENT OFFICE.

EDDIE C. FILSTRUP, OF BENTON HARBOR, MICHIGAN, ASSIGNOR TO COVEL MANUFACTURING CO., OF BENTON HARBOR, MICHIGAN, A CORPORATION OF MICHIGAN.

FEED-FINGER-ACTUATING DEVICE FOR SAW-SHARPENING MACHINES.

Application filed January 14, 1927. Serial No. 161,122.

This invention relates to saw sharpening machines of the class in which the saw to be sharpened is fed through the machine with a step-by-step movement and at each step a tooth is acted upon by a grinding wheel to shape the back of the tooth and also its hook and throat.

My improvement relates more particularly to automatic friction-control means for the feed finger that imparts the step-by-step movement to the saw blade.

In my invention, as also in the machines heretofore used, the saw is intermittently fed forward by a back and forth movement of the feed finger in the direction of the length of the saw. The finger that engages the saw is fixed to a finger holder hinged to a feed block mounted on the upper end of a feed arm.

The feed arm has a back and forth oscillating movement, as is common in saw sharpening machines of the class to which my invention belongs.

In some machines the feed finger, when giving the feeding movement to the saw, engages the face of each tooth successively and when being retracted for engagement with the next tooth the finger rides over the back of the adjacent tooth and drops down into the next tooth space ready to feed the succeeding tooth.

In another type of machine, and it is to this type that my invention applies, the feed finger does not ride up over the backs of the teeth, but is located at one side of the saw blade and not only has the back and forth feed movement above described, but also has a thrusting movement in a direction transverse to the plane of the saw teeth causing it to enter and leave the throats of the teeth from the side.

My present improvement relates to an improved adjustable friction-actuated means operatively associated with the feed block and adapted at each reversal of movement of the block to automatically impart sidewise movement to the feed finger.

My improvement further relates to a novel means for adjusting the path of movement of the finger holder in its back and forth travel with respect to the path of movement of the feed block by which it is carried, without interfering with the automatic operation of the friction device by which the feed finger, at each reversal of movement of the block, is made to automatically move sidewise to engage and disengage the saw teeth.

With the foregoing and certain other objects in view, which will appear later in the specifications, my invention comprises the devices described and claimed and the equivalents thereof.

In the drawings Fig. 1 is a side view of part of the frame of a saw grinding machine showing my improved feed finger actuating mechanism.

Fig. 2 is a top plan view of parts shown in Fig. 1.

Fig. 3 is a plan view of a detail of the parts by which the feed finger is shifted laterally.

As is clearly shown in the drawings, numeral 1 indicates the band saw blade, which is given an intermittent feed movement by means of finger 2. The finger, when thrust laterally across the plane of the saw blade, as indicated by the dotted lines at 3, engages in the face of a tooth and when retracted clears the tooth. The actual saw-feeding movement is imparted substantially in the manner common in machines of this kind, that is, the finger 2 is mounted on a finger holder 4 which is hinged, as at 5, to the feed block 6, which may be mounted either on suitable ways, or as is more usually the case, upon the end of a feed arm 7, to which is imparted a forward and return movement, indicated by the arrows in Fig. 1. Since the means for imparting such movement to feed arm 7 and its feed block 6 are old and well-known in the art, its illustration is omitted.

As shown in Fig. 2, the finger holder 4 has a lateral shifting movement on its hinge pintle 5, as indicated by dotted lines, the purpose being to give the finger 2 a limited sidewise shifting movement with respect to the feed block.

To impart such lateral movement to finger holder 4, I form on its under face a suitable guideway 4ª which slidingly receives the end 8 of an L-lever 9. The L-lever is pivoted at 10 to a bracket 11 fixed to the side of feed block 6 and is movable back and forth with it. The other extremity of the L-lever is pivoted to the end of a bar 12 and when this bar is moved back and forth in the direction of its length it actuates the L-lever and shifts finger holder 4 and finger 2 laterally so as to project or retract the finger and engage it or disengage it with the saw teeth.

If bar 12 is held stationary and block 6 is given a forward and return motion by arm 7, as indicated by the arrows in Fig. 1, the finger 2 will not only be given the desired sidewise shifting movement with respect to the blank, but also will be simultaneously moved forward or backward with feed block 6 and finger holder 4 to impart the feeding movement to saw blade 1.

My invention, therefore, includes a novel means for frictionally holding bar 12 normally immovable, but permitting it to slide lengthwise subject to sufficient frictional resistance to cause the required lateral shifting of finger 2, as above described. In order to impart frictional resistance to bar 12, and yet permit it to slide when that resistance is overcome, I provide friction pads 13 of fibre or other suitable material to engage the sides of bar 12, and I mount these pads in a bracket 14 which is fixed to the frame of the machine.

Either one or both of the friction pads 13 may be yieldingly pressed against bar 12 by a spring 15, adjustable by means of a screw 16. Any desired amount of frictional resistance may thus be given to the bar 12 to cause the latter to project or retract the finger 2 at the beginning of each forward or return movement of feed block 6.

When feed block 6 is moved to the right in Fig. 1 by feed arm 7 it pulls the bar 12, but the latter, under the resistance of the friction pads 13, does not immediately move. Pivot 10, however, moves forward with feed block 6, causing the L-lever 9 to turn and its end 8 to shift the finger holder 4 and its finger 2 into the position shown by the dotted lines in Fig. 2. Similarly, upon reversal of its movement, feed block 6 retracts the finger 2 to clear the saw blade. The amount of lateral movement of finger bar 4 is limited by the amount of play along the hinge pintle 5 in feed block 6 and at each extremity of its movement the pull on bar 12 overcomes the frictional resistance of pads 13 and slides between them, so that during the feeding movement of finger 2 it is held in its projected position and during its return movement it is held in its retracted position.

For the purpose of making adjustment to compensate for wear and to assist in properly assembling the finger actuating mechanism with respect to the feed arm, I provide means for adjusting the position of the feed block 6 on the end of feed arm 7 in the direction parallel with the plane of the saw blade. As to details of construction, various adjusting devices may be employed for this purpose, but I prefer the means shown in Figs. 2, in which 17 is an adjusting screw mounted in the upper end of feed arm 7 and swiveled at its inner end to feed block 6. By turning screw 17 the relation of the feed block to the upper end of feed arm 7 can be set as desired in order to give finger 2 the exact path of travel required.

By the means above described I have produced a simple and relatively inexpensive mechanism for automatically projecting and retracting the feed finger of a saw sharpening machine in a direction at right angles to the plane of the saw. The device is capable, without special adjustment, of adapting itself to saws of different sizes and different pitch.

Furthermore, the reciprocating head with its sidewise shiftable holder that carries the feed finger and the adjustable automatic friction-actuated mechanism, namely, the L-lever and its connections mounted on the feed block, provides a reliable device whereby sidewise shifting movement is automatically imparted to the feed finger, causing it alternately to project across and withdraw from the plane of the saw at each reversal of movement of the reciprocating head.

Having thus described my invention, what I claim and desire to secure by Letters Patent is:

1. In a saw sharpening machine, the combination of a feed arm, a feed block thereon adapted to forward and return movement, a finger carried by said block and capable of limited sidewise shifting movement with respect thereto, friction-actuated means operatively associated with said block and adapted to automatically impart sidewise movement to said finger upon each reversal of movement of said block, and means for adjusting the position of said block and finger on said feed arm.

2. In a saw sharpening machine, a feed block adapted to forward and return movement, a finger holder carried by said block and laterally shiftable thereon, holder shifting means on said block adapted to move said finger holder laterally, friction-actuated means for engaging and actuating said holder shifting means during the beginning of the forward and return movement of said block.

3. In a saw sharpening machine, a feed block adapted to forward and backward movement and having thereon a feed finger holder capable of limited sidewise shifting movement with respect to said block, friction-actuated means operatively associated with said block and adapted at each reversal of movement of said block to automatically impart sidewise movement to said feed finger holder.

4. In a saw sharpening machine, a feed block adapted to forward and backward movement, a feed finger holder hinged to said block and capable of limited sidewise shifting movement with respect thereto, an L-lever pivotally mounted on said block and connected with said holder, friction-actuated means operatively associated with said L-lever and adapted at each reversal of movement of said block to automatically actuate said L-lever to impart sidewise movement to said feed finger holder.

5. In a saw sharpening machine, a feed block adapted to forward and backward movement and having thereon a feed finger holder capable of limited sidewise shifting movement with respect to said block, an L-lever having a pair of arms pivotally mounted on said block, one of said arms connected with said finger holder, a friction bar connected to the other arm of the L-lever and pads slidingly engaged by said friction bar and adapted at each reversal of movement of said block to automatically retard the movement of said friction bar and L-lever and thereby impart sidewise movement to said feed finger holder.

6. In a saw sharpening machine, a feed block adapted to forward and return movement, a finger holder hinged upon said block and laterally shiftable thereon, holder shifting means on said block adapted to move said finger holder laterally, friction devices for engaging and actuating said holder shifting means during the beginning of the forward and return movement of said block.

7. In a saw sharpening machine, a feed block adapted to forward and return movement, a finger holder carried by said block and laterally shiftable thereon, holder shifting means comprising guideways on said finger holder, an L-lever pivotally mounted on said block and movable back and forth therewith, an end of said L-lever engaging said guideway, a bar pivoted to an end of said L-lever, friction means engaging said bar for holding the bar normally immovable during the first part of the forward and return movement of said block, but permitting the bar to slide lengthwise during the latter part of said movement, for the purposes set forth.

In testimony whereof, I affix my signature.

EDDIE C. FILSTRUP.